UNITED STATES PATENT OFFICE.

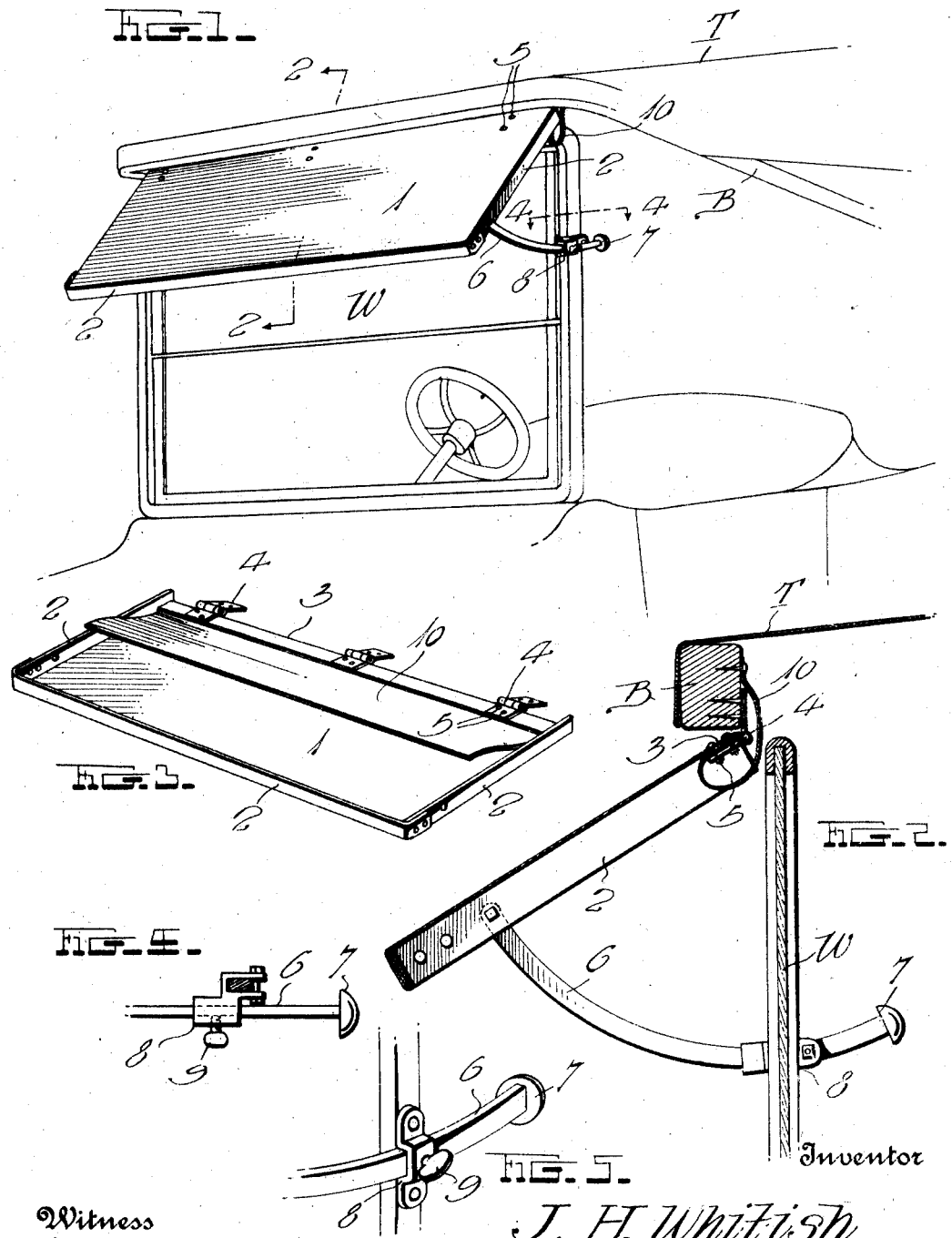

JOSEPH H. WHITISH, OF FENNIMORE, WISCONSIN.

STORM AND SUN GUARD FOR AUTOMOBILES.

1,401,382.  Specification of Letters Patent.  Patented Dec. 27, 1921.

Application filed November 29, 1920. Serial No. 427,042.

*To all whom it may concern:*

Be it known that I, JOSEPH H. WHITISH, a citizen of the United States, residing at Fennimore, in the county of Grant and State of Wisconsin, have invented certain new and useful Improvements in Storm and Sun Guards for Automobiles; and I do declare the following to be a full, clear, and exact description of the invention such as will enable others skilled in the art to which it appertains to make and use the same.

This invention relates broadly to improvements in automobile windshields, and has more particular reference to an attachment for the latter which constitutes a guard and becomes extremely effective and advantageous when storms are raging and is also very effective in preventing the glare of the sun or the glare from headlights of an approaching machine from blinding the driver, thereby avoiding many accidents.

The principal object of the invention is to generally improve upon and simplify attachments of this class by the provision of one of extreme simplicity and durability, which is easy to attach and detach and is such in construction that it can be folded back against the underside of the top of the machine when the latter is in inoperative position.

Another object of the invention is to provide an attachment of the above mentioned class which is designed to be hingedly connected to the usual forward bow of the vehicle top, there being means coöperative with brackets to be positioned on the uprights of the windshield, for supporting and retaining the guard in various inclined positions.

A still further object of the invention is to provide an attachment of this class which consists of a plate of sheet metal which has its opposite ends and forward longitudinal edge bent down at right angles to provide flanges which serve to prevent novel means for connection of the supporting arms and also assist in preventing the driving rain from coming into engagement with the upper section of the windshield when severe storms are in progress.

A further and very important object of the invention is to provide an attachment of this class which embodies a flexible water collecting trough of waterproof material, this trough being arranged at the point of connection of the device with the vehicle top and serving to prevent entrance of rain to the interior of the machine.

Other objects and advantages of the invention will be apparent during the course of the following description.

In the acompanying drawings forming a part of this specification and in which like numerals are employed to designate like parts throughout the same:

Figure 1 is a perspective view of a portion of an automobile equipped with a guard constructed in accordance with this invention.

Fig. 2 is an enlarged sectional view taken substantially on the plane of the line 2—2 of Fig. 1 looking in the direction of the arrows.

Fig. 3 is an inverted perspective view of a guard constructed in accordance with the invention, the operating rod and attaching bracket being removed.

Fig. 4 is a view taken on the line 4—4 of Fig. 1.

Fig. 5 is a view disclosing a slightly modified form of a bracket for attachment to one of the uprights of the windshield.

In the drawings, for the purpose of clear illustration, I have shown portions of a conventional type of automobile to enable the reader to obtain a clear understanding of the manner in which the device is associated with these portions. Referring to these parts by letters, it will be seen that W designates a windshield and T designates the vehicle top which is provided with the usual U-shaped supporting bow B.

My improved attachment comprises a guard 1 which is preferably composed from a substantially rectangular sheet of metal. When constructed in accordance with this invention, this guard has its opposed ends and front longitudinal edge bent downwardly at right angles to provide flanges 2. As before indicated, these flanges assist in preventing driving rain from striking the windshield and they also serve to reinforce the plate. The remaining longitudinal edge of this plate is bent upon itself to provide a strip 3 to which a plurality of hinges 4 are secured by means of suitable securing bolts 5. As disclosed in the drawings, the free leaves of the hinges are secured to the rear vertical face of the forward bow of the vehicle top T, and this construction and arrangement provides a novel pivotal mounting for the guard and permits the latter to be moved to various inclined positions.

In order to support the guard in these various inclined positions, I employ a pair of arcuate arms or rods 6 which have detachable pivotal connection with the downturned end flanges 2 at one of their ends, being provided at their opposite ends with knobs or the like 7. These arms 6 are slidable through brackets 8 which are secured to the uprights of the windshield W, these brackets being provided with set-screws 9 for retaining the arms in various adjusted positions. At this point, I wish to mention that any suitable kind of a bracket may be employed for co-action with the arms 6. In Fig. 1 I have shown one type of bracket which I intend to employ and in Fig. 5 I have disclosed another type of bracket which I employ sometimes. With this construction and arrangement, it will be seen that the guard may be moved to various positions and retained in these positions and may be very conveniently operated from the driver's seat.

As before intimated, it is my desire to provide novel means for preventing entrance of rain and moisture to the interior of the automobile. To this end, I make use of a trough which is preferably composed from a sheet or piece of flexible water-proof material 10. This material 10 is substantially rectangular in shape and it has one of its sides engaged by the strip 3 and partially retained in engagement with the strip by means of the bolts 5 which also serve an additional function already set forth. The free longitudinal edge of this trough is tacked or otherwise secured to the rear vertical face of the bow B. When the trough is in proper position, it is allowed to sag in the manner disclosed, consequently any rain which may find its way between the member B and rear edge of the guard 1 will be collected in this trough and will flow endwise from the latter onto the ground. Due to the flexibility of this trough, it will not interfere with the moving of the guard against the underface of the top when the latter is folded and out of use.

Not only does the trough function in the foregoing manner, but it also serves, to some extent, to prevent the entrance of cold air at the point at which it is located, thus insuring comfort to the occupants of the car.

From the foregoing description, it will be understood that by moving the arms 6 either forwardly or rearwardly as desired, the guard 1 will be moved accordingly to the desired inclined position. Having obtained the desired position, the set-screws may be bound against the arms 6 so that the latter will be retained in the position to which they have been moved. It is to be noted that the flexibility of the trough 10 will permit free movement of the guard. A careful consideration of the description taken in connection with the drawing, is thought to be sufficient to enable persons skilled in the art to which this invention relates, to obtain a clear understanding of the manner in which the device is attached and detached, and the manner in which it operates, therefore, a more lengthy and detailed description is deemed unnecessary.

While I have shown and described my guard as being connected to the bow of the vehicle top through the medium of hinges, I wish it to be understood that it may be pivotally connected to the windshield if desired.

Since probably the best results may be obtained with the construction and arrangement shown and described, this construction and arrangement is taken as a preferred embodiment of the invention. However, it is to be understood that various minor changes in the shape, size, and arrangement of parts may be resorted to without departing from the spirit of the invention or the scope of the subjoined claims.

I claim:

1. An attachment for vehicle windshields comprising a substantially rectangular metal plate having its forward longitudinal edge and its two end edges bent laterally downward to provide relatively wide flanges, the remaining edge of said plate being bent upon itself to provide a forwardly opening channel, a plurality of hinges secured to said channel, being adapted to have their free leaves attached to the usual forward bow of the vehicle top, a water collecting trough in the form of a rectangular sheet of water-proof material, one end of which is secured in said channel and the opposite end of which is adapted to be connected to the aforesaid bow, brackets including set-screws adapted for connection to the uprights of the windshield, and arcuate arms passing slidably through said brackets and having pivotal connection at one of their ends with the end flanges of said plate.

2. A vehicle windshield attachment comprising a guard adapted to be mounted in front of a windshield, hinges carried by the upper portion of the guard for connection to the front bow of a vehicle top above the windshield, and a trough of flexible material having one side portion connected with the upper portion of the guard, the free side portion of the flexible material being adapted to pass upwardly between the outer face of the windshield and front bow of a vehicle top and be connected with the front bow to provide a trough between the windshield and hinged end of the guard whereby water may be caught and prevented from entering the interior of an automobile between the space between the upper edge of the windshield and said bow.

3. The structure set forth in claim 2 having the trough formed from a sheet of water-proof fabric having one side portion secured to the upper edge portion of the guard, said sheet extending transversely of the guard toward the lower edge thereof and having its free side portion adapted to be turned back and carried upwardly between the bow and outer face of the windshield for connection to the bow.

4. The combination with a vehicle windshield and top extending above the windshield and having a forward bow positioned above and forwardly of the windshield, of a guard plate hingedly connected with the bow and extending in front of the windshield, and a strip of flexible material having one side portion secured to the upper edge portion of said guard, the strip being turned back upon itself and carried upwardly between the windshield and front bow of the top and connected with the front bow to provide a water catching trough between the windshield and guard and bow.

In testimony whereof I have hereunto set my hand.

JOSEPH H. WHITISH.